United States Patent Office 3,654,352
Patented Apr. 4, 1972

3,654,352
PURIFICATION OF TEREPHTHALIC OR ISOPHTHALIC ACID
Enrique R. Witt, William J. Humphrey, and Arthur W. Schnizer, Corpus Christi, Tex., assignors to Celanese Corporation, New York, N.Y.
No Drawing. Filed Apr. 2, 1969, Ser. No. 812,859
Int. Cl. C07c 51/42, 51/48
U.S. Cl. 260—525
11 Claims

ABSTRACT OF THE DISCLOSURE

A process for the purification of terephthalic and/or isophthalic acid by recrystallization of the impure acid from the solvent in the presence of a compound having the

radical.

BACKGROUND OF THE INVENTION

The present invention relates to the purification of terephthalic or isophthalic acid and more particularly deals with the purification of crude terephthalic or isophthalic acids containing aldehydes and/or ketones as impurities.

In recent years the production of polyesters such as polyethylene terephthalate has become of significant commercial importance. For many end uses of these polyesters a carboxylic starting material of very high purity is required so as to avoid discoloration of the end product. Although all of the compounds which contribute to the color of the polymer have not been identified it is generally considered that the aldehydes and ketones present as impurities in the dicarboxylic acid starting material contribute significantly to discoloration. One of the most widely used methods of producing terephthalic or isophthalic acid is by the oxidation of a dialkyl benzene such as xylene or diisopropyl benzene and it is generally due to incomplete oxidation of the dialkyl benzene that these aldehyde or ketone impurities arise. For example in the production of terephthalic acid by the oxidation of p-xylene, 4-carboxybenzaldehyde is also usually present in the product as a major impurity due to incomplete oxidation of the p-xylene. Of course if m-xylene were being oxidized to isophthalic acid, the impurity would not be 4-carboxybenzaldehyde but would be 3-carboxybenzaldehyde. Just as carboxybenzaldehyde is usually present in terephthalic or isophthalic acid produced by oxidizing xylene, the impurity p-acetylbenzoic acid $$(CH_3COC_6H_4COOH)$$

is usually present in crude terephthalic acid produced by the oxidation of p-diisopropyl benzene. Aldehyde and ketone impurities may also be introduced into the crude dicarboxylic acids by means other than incomplete oxidation such as by the use of a methyl ethyl ketone or acetaldehyde co-oxidant in the oxidation process.

Various processes have been devised for the purification of terephthalic acid and isophthalic acid containing impurities which contribute to discoloration and these processes include those involving recrystallization from various recrystallization solvents such as water. However recrystallization is not considered to be an efficient technique for removal of impurities such as carboxybenzaldehyde.

SUMMARY

It is thus an object of the present invention to provide an improved method for the purification of terephthalic acid or isophthalic acid. It is a further object of the present invention to provide an improved method for the removal of aldehyde or ketone impurities, particularly carboxybenzaldehyde, from crude terephthalic acid or isophthalic acid. Another object of the present invention is to provide an improvement in a process wherein terephthalic acid or isophthalic acid is recrystallized from a solvent in order to purify the terephthalic or isophthalic acid. Additional objects will become apparent from the following description of the present invention.

These and other objects are accomplished by the present invention which in one of its embodiments is a process for the purification of crude terephthalic or isophthalic acid comprising forming a solution of said crude terephthalic or isophthalic acid and a hydrazine compound having a

radical, crystallizing the terephthalic or isophthalic acid from said solution and recovering the thus crystallized, solid terephthalic or isophthalic acid.

DESCRIPTION OF THE PREFERRED EMBODIMENT

As may be seen from the above summary, the process of the present invention is relatively simple in operation as it involves recrystallization of a crude terephthalic acid or isophthalic acid from solution in a solvent, the solution having been treated with a hydrazine compound having at least one

radical. This process enables one to obtain a dicarboxylic acid product of extremely high purity and is applicable to the purification of terephthalic acid or isophthalic acid, or mixtures thereof, having various impurities. The process is generally most applicable to the purification of crude terephthalic acid or isophthalic acid having ketones or aldehydes, especially aromatic aldehydes or aromatic ketones such as carboxybenzaldehyde, as impurities. The present process is particularly applicable to the treatment of terephthalic acid having 4-carboxybenzaldehyde as an impurity.

In carrying out the process of the present invention the order of the addition of the reactants is not critical. For example a solution of the crude dicarboxylic acid in the solvent may first be obtained and then the hydrazine compound be added thereto, or the hydrazine may first be added to the solvent and then the crude diacid added. Likewise the crude dicarboxylic acid may first be mixed with the hydrazine compound and then this mixture be combined with the solvent and heated to a temperature sufficient to dissolve the dicarboxylic acid. The temperature required for dissolution of the crude dicarboxylic acid will of course depend upon the particular solvent being utilized and the ratio of the crude dicarboxylic acid and the solvent. However since at ordinary temperatures, terephthalic acid and isophthalic acid, particularly terephthalic acid, are fairly insoluble in most solvents, the temperature required for dissolution of the crude dicarboxylic acid will be at least about 100° C. and generally will be within the range of about 140 to 325° C. When treating terephthalic acid, the preferred range will generally be from about 190 to 325° C. The pressure utilized in the portion of the process wherein the solution of the dicarboxylic acid and the hydrazine compound are formed need be only enough to maintain the solvent in liquid phase. If this temperature is above the normal boiling point of the solvent then superatmospheric pressures will generally be necessary.

After the solution of the dicarboxylic acid and the hydrazine compound is formed, the solution can be cooled so as to cause crystallization of the dicarboxylic acid and then the crystals may be recovered by any convenient method such as decantation, filtration, centrifugation, and the like. If desired the cooling to effect crystallization can be accompanied by reduction of the pressure as in a vacuum crystallizer.

The hydrazine compound containing an $$-\overset{|}{\text{N}}\text{NH}_2$$

radical that is utilized in the present invention may be hydrazine itself, which is preferable, or may be a derivative of hydrazine such as a monosubstituted or a symmetric disubstituted hydrazine, a primary acyl hydrazide, a urea derivative of hydrazine, or an aminoguanidine compound. These compounds preferably have less than 20 carbon atoms (if any) and are generally of the formula $$\underset{\underset{\text{R}_2-\text{N}-\text{NH}_2}{|}}{\overset{\text{R}_1}{|}} \qquad \text{(I)}$$

wherein $R_1$ and $R_2$ are hydrogen or a monovalent radical made up solely of elements selected from the group consisting of carbon, hydrogen, oxygen, and nitrogen. In addition to this such a monovalent radical should be free of aldehydic or ketonic carbonyl groups and also are preferably free of ethylenic and acetylenic unsaturation. By ethylenic and acetylenic unsaturation is meant that no carbon to carbon double bonds or triple bonds exist in the radical. For example the monovalent radical could be a hydrocarbon radical or an acyl radical.

Hydrazine and the suitable substituted hydrazines are generally of the formula $$\underset{\underset{\text{R}_3-\text{N}-\text{NH}_2}{|}}{\overset{\text{R}_4}{|}} \qquad \text{(II)}$$

wherein $R_3$ and $R_4$ are hydrogen or organic radicals which may be alike or different. When $R_3$ and $R_4$ are organic radicals they are preferably hydrocarbon radicals free of ethylenic and acetylenic unsaturation, e.g. alkyl or aryl radicals, especially those hydrocarbon radicals of 1 to 7 carbon atoms. Some suitable substituted hydrazines include 1,1-diphenyl hydrazine, (1-naphthyl)-hydrazine, o-nitrophenyl hydrazine, methyl hydrazine, 1,1-dimethyl hydrazine, phenyl hydrazine, benzyl hydrazine, butyl hydrazine, 1,1 - dipropyl hydrazine, β-hydroxyethyl hydrazine, and 1-hydrazinophthalazine.

The primary acyl hydrazides which may be utilized in the present invention are well known compounds of the general formula $$R_5 - \left( \overset{\overset{\text{O}}{\|}}{\text{C}}\text{NHNH}_2 \right)_n \qquad \text{(III)}$$

wherein $R_5$ is an organic radical or hydrogen and wherein $n$ is a number of 1 or 2, preferably 1. It is of course understood that $R_5$ would necessarily be a bivalent radical when $n$ is 2. Hydrazides are generally prepared from esters of carboxylic acids and therefore they are generally named as derivatives of these carboxylic acids. Thus in the above Formula III, when $n$ is 1 and $R_5$ is a methyl radical, one has a compound of the formula $$\text{CH}_3\text{CONHNH}_2$$

which is called acetic acid hydrazide. Likewise, if $n$ is 2 and $R_5$ is a p-phenylene radical, the hydrazide is terephthalic acid dihydrazide of the formula:

$$\text{H}_2\text{NHN}\overset{\overset{\text{O}}{\|}}{\text{C}}-\!\!\!\left\langle\phantom{x}\right\rangle\!\!\!-\overset{\overset{\text{O}}{\|}}{\text{C}}\text{NHNH}_2 \qquad \text{(IV)}$$

Generally $R_5$ in Formula III above will be hydrogen or an organic radical of 1 to 10 carbon atoms free of ethylenic and acetylenic unsaturation and containing in addition to the carbon atoms no elements other than hydrogen, oxygen, and nitrogen. As was pointed out above the radical should also be free of ketonic or aldehydic carbonyl groups. Thus $R_5$ could be a hydrocarbon radical free of ethylenic unsaturation such as butyl or a carboxyl-substituted hydrocarbon radical such as p-carboxyphenyl. In addition to those already mentioned suitable acyl hydrazides suitable for use in the present invention include benzoic acid hydrazide (which may also be called benzoyl hydrazine) formic acid hydrazide, isonicotinic acid hydrazide, butyric acid hydrazide, adipodihydrazide, dodecanedioic dihydrazide, trimesic acid trihydrazide, and the like. The preferred primary acyl hydrazides of Formula III are those where $R_5$ is an alkyl or aryl radical and $n$ is 1.

The third major class of compounds which may be utilized in the present invention are the hydrazides which are derivatives of urea and which are of the general formula $$R_6-\text{NH}\overset{\overset{\text{O}}{\|}}{\text{C}}\text{NHNH}_2 \qquad \text{(V)}$$

wherein $R_6$ is a radical containing as the only elements those selected from the group consisting of carbon, hydrogen, oxygen, and nitrogen and which is free of ethylenic and acetylenic unsaturation and also free of ketonic or aldehydic carbonyl group. $R_6$ in Formula V is generally hydrogen, an $-\text{NH}_2$ radical, or a radical of the formula $$R_7-\text{NH}\overset{\overset{\text{O}}{\|}}{\text{C}}-$$

$R_7$ being a hydrogen or a hydrocarbon radical of 1 to 10 carbon atoms free of ethylenic and acetylenic unsaturation. When $R_6$ is hydrogen in the above formula the compound is of course semicarbazide while the compound is carbohydrazide when $R_6$ is an $-\text{NH}_2$ radical. The hydrazide wherein $R_6$ is a radical of the formula $$R_7\text{NH}\overset{\overset{\text{O}}{\|}}{\text{C}}$$

that is those hydrazides of the formula $$R_7\text{NH}\overset{\overset{\text{O}}{\|}}{\text{C}}\text{NH}\overset{\overset{\text{O}}{\|}}{\text{C}}\text{NHNH}_2 \qquad \text{(VI)}$$

are generally formed by reacting hydrazine with the ester portion of a urea carboxylic acid ester and therefore these compounds are generally named as derivatives of the urea carboxylic acid.

Another major class of compounds that may be utilized in the present invention include those of the formula $$R_8-\text{HN}\overset{\overset{\overset{\text{R}_9}{|}}{\underset{\|}{\text{N}}}}{\text{C}}\text{NHNH}_2 \qquad \text{(VII)}$$

wherein $R_8$ and $R_9$ are hydrogen, an $-\text{NH}_2$ radical or a hydrocarbon radical free of ethylenic and acetylenic unsaturation. Thus both $R_8$ and $R_9$ could be hydrogen in which case the compound would be aminoguanidine, while if both $R_8$ and $R_9$ were $-\text{NH}_2$ groups the compound would be triaminoguanidine. In the above Formula VII $R_8$ and $R_9$ are preferably hydrogen or $-\text{NH}_2$ radicals.

In utilizing hydrazine or the hydrazine derivatives in the present process they may be added as the compound per se or may be added in other forms such as in aqueous solution, in the form of hydrates, inorganic salts or organic salts. If the hydrazine compound is added as a salt, the preferred inorganic salts are those of hydrochloric or sulfuric acid while the preferred organic salts are those of the lower aliphatic carboxylic acids. For example if it is desired to use hydrazine, the hydrazine could be added as hydrazine monohydrate, $$\text{NH}_2\text{NH}_2\cdot\text{H}_2\text{O}$$

hydrazine hydrobromide, $\text{NH}_2\text{NH}_2\cdot\text{HBr}$; hydrazine monohydrochloride, $\text{NH}_2\text{NH}_2\cdot\text{HCl}$; dihydrazine sulfate, $(\text{NH}_2\text{NH}_2)_2\cdot\text{H}_2\text{SO}_4)$; hydrazine acetate, $$\text{H}_2\text{NNH}_2-\text{CH}_3\text{COOH}$$

phenyl hydrazine hydrochloride, $\text{C}_6\text{H}_5\text{NNH}_2\cdot\text{HCl}$; and the like. The amount of the hydrazine compound that is utilized may vary widely and will depend upon several variables such as the desired degree of purification, the amount of impurities present, etc. However it may be stated that the hydrazine compound will usually be present in an amount less than 10 weight percent based on the weight of the dicarboxylic acid and generally will be present in amounts from about 0.05 to 1.0 weight percent based on the weight of the dicarboxylic acid. When the dicarboxylic acid is one which contains aldehydes or ketones as impurities, the treatment of which the present process is especially suitable, the most convenient method for determining the amount of hydrazine compound is to add the hydrazine compound in an amount sufficient to provide from about 1 to 500 equivalents per equivalent of ketonic or aldehydic carbonyl group, that is to provide from about 1 to 500

$$-\overset{|}{\text{N}}\text{NH}_2$$

groups per ketonic or aldehyde carbonyl group present. It is preferable to use from about 10 to 100 equivalents of the hydrazine compound per equivalent of the ketone or aldehyde. In treating terephthalic acid containing 4-carboxybenzaldehyde as the impurity, it is preferred to add the hydrazine compound in amounts based on the amount of 4-carboxybenzaldehyde present.

The recrystallization solvent that may be utilized in the present invention varies, with the main requirement of the solvent being that it be inert under the conditions of the process. By inert is meant that the recrystallization solvent should not under the process conditions react to any appreciable extent with the dicarboxylic acid being purified nor should the solvent react with the hydrazine compound to such an extent that no $$-\overset{|}{\text{N}}\text{NH}_2$$

groups remain. This is not to say that no reaction at all occurs between the hydrazine compound and the solvent. For example when using hydrazine, acetic acid may be used as a solvent even though the acetic acid probably reacts with some of the hydrazine to form acetic acid hydrazide, which still retains an —$NNH_2$ group, and, probably also reacts with some of the hydrazine to form diacetic acid hydrazide, $CH_3CONHNHCOCH_3$, which would not be useful in the present invention. Suitable recrystallization solvents include water, $C_5+$ hydrocarbons and carboxylic acids. By a $C_5+$ hydrocarbon is meant those having five or more carbon atoms and the hydrocarbons utilized are preferably those free of ethylenic and acetylenic unsaturation having a melting point less than 100° C., with mononuclear aromatic hydrocarbons being preferred. Examples of suitable hydrocarbons include benzene, xylene, toluene, cyclohexane, methylnaphthalene, Tetralin, and the like. Of the carboxylic acids the lower ($C_1$ to $C_7$) aliphatic carboxylic acids such as acetic and propionic are preferred with acetic acid being preferred over the others. Other carboxylic acids which may be used include benzoic acid and phenyl acetic acid. The preferred liquid for use as a solvent in the present invention is one consisting essentially of from 50 to 100% percent by weight of water and 0 to 50% percent by weight of a $C_2$ to $C_5$ aliphatic carboxylic acid.

The ratio of solvent to crude dicarboxylic may vary widely but generally the amount of solvent should be such that the crude terephthalic or isophthalic acid is present in amounts of from about 2 to 60%, preferably 5 to 40% by weight based on the combined weight of crude dicarboxylic acid and solvent.

In order to illustrate the present invention the following example is offered.

EXAMPLE

Several runs are made wherein crude terephthalic acid containing about 3000 p.p.m. of 4-carboxybenzaldehyde impurities is purified in accordance with the present invention. In each of the runs the crude terephthalic acid, a solvent, and a hydrazine compound are mixed at room temperature and then heated in a 3 liter autoclave at autogenous pressure to about 300° C. so as to dissolve the terephthalic acid in the solvent. After a few minutes the solution is cooled so as to cause the terephthalic acid to recrystallize from solution. The thus recrystallized terephthalic acid is separated by filtration, washed with acetic acid, and dried. The amount of crude terephthalic acid utilized in each run is about 250 grams and the amount of solvent utilized in each run is about 1416 grams. The following table indicates the solvent being utilized in each run, the hydrazine compound and amount thereof being utilized in each run, and the results of each run. All parts and percentages are by weight.

TABLE

| Run No. | Hydrazine compound Type | Amount, g. | Solvent | Product, p.p.m. CBA |
|---|---|---|---|---|
| 1 | Hydrazine diacetate | 4.2 | Water | <5 |
| 2 | Hydrazine [1] | 6.5 | 50% water, 50% acetic acid | 50 |
| 3 | do.[1] | 6.5 | 95% acetic acid 5% water | 254 |
| 4 | do | 1.6 | 90% water, 10% acetic acid | 18 |
| 5 | 1,1-dimethyl hydrazine | 7.8 | do | 10 |
| 6 | None | | do | 650 |
| 7 | Acetic acid hydrazide | 5.0 | do | 25 |
| 8 | p-Toluic acid hydrazide | 5.0 | do | 35 |
| 9 | Carbohydrazide | 1.5 | do | 15 |
| 10 | Aminoguanidine acetate | 2.0 | do | 25 |

[1] Added as a 64% solution in water.

The embodiments of the invention in which an exclusive property or privilege is claimed are defined as follows:

1. A process for the purification of crude terephthalic or isophthalic acid formed by the oxidation of an alkyl benzene compound comprising forming a solution in an inert solvent of said crude terephthalic acid or isophthalic acid and a hydrazine compound, said hydrazine compound having less than 20 carbon atoms and being of the following formula $$R_2-\overset{R_1}{\underset{|}{N}}-NH_2$$

wherein $R_1$ and $R_2$ are hydrogen or monovalent radicals free of ethylenic and acetylenic unsaturation, free of ketonic or aldehydic carbonyl groups and which radicals contain only elements selected from the group consisting of carbon, hydrogen, oxygen, and nitrogen; crystallizing the terephthalic or isophthalic acid from said solution, and recovering the thus crystallized terephthalic or isophthalic acid.

2. The process of claim 1 wherein $R_1$ and $R_2$ are hydrogen, hydrocarbon radicals or acyl radicals, one of $R_1$ and $R_2$ being hydrogen when the other is an acyl radical.

3. The process of claim 2 wherein the compound is one of the formula $$R_3-\overset{R_4}{\underset{|}{N}}-NH_2$$

wherein $R_3$ and $R_4$ are hydrogen or a hydrocarbon radical free of ethylenic and acetylenic unsaturation containing from 1 to 7 carbon atoms.

4. The process of claim 3 wherein said hydrazine compound is hydrazine.

5. The process of claim 1 wherein the crude acid is terephthalic acid, wherein said hydrazine compound is one of the formula $$R_3-\overset{R_4}{\underset{|}{N}}-NH_2$$

wherein $R_3$ and $R_4$ are hydrogen or hydrocarbon radicals of 1 to 7 carbon atoms free of ethylenic and acetylenic unsaturation.

6. The process of claim 5 wherein the crude terephthalic acid is present in amounts of from about 5 to 40 percent based on the combined weight of said crude terephthalic acid and solvent, wherein said crude terephthalic acid contains aromatic aldehydes or aromatic ketones as impurities and wherein said compound is present so as to provide from about 10 to 100 equivalents per equivalent of aldehydes and ketones present as impurities in said crude terephthalic acid.

7. The process of claim 6 wherein said solvent is selected from the group consisting of water, $C_1$ to $C_7$ aliphatic carboxylic acids, benzoic acid, phenyl acetic acid, and $C_5^+$ hydrocarbons free of ethylenic and acetylenic unsaturation.

8. The process of claim 7 wherein crude terephthalic acid containing 4-carboxybenzaldehyde is being purified.

9. The process of claim 8 wherein said solvent consists of 50 to 100 percent water and 0 to 50 percent by weight of an aliphatic carboxylic acid of 2 to 5 carbon atoms.

10. The process of claim 9 wherein said hydrazine compound is hydrazine.

11. The process of claim 10 wherein said hydrazine is added as a hydrate, a salt of hydrochloric acid or as a salt of acetic acid.

References Cited

UNITED STATES PATENTS

| 3,171,856 | 3/1965 | Kurtz | 260—525 |
|---|---|---|---|
| 3,364,256 | 1/1968 | Ichikawa et al. | 260—525 |

FOREIGN PATENTS

| 786,897 | 11/1957 | Great Britain | 260—525 |

OTHER REFERENCES

Moeller, "Inorganic Chemistry," 1952, pp. 583–4.

Fieser et al., "Organic Chemistry," 3rd ed., 1956, pp. 211–2.

JAMES A. PATTEN, Primary Examiner

R. S. WEISSBERG, Assistant Examiner